US 8,009,675 B2

(12) United States Patent
Andersson (10) Patent No.: US 8,009,675 B2
(45) Date of Patent: Aug. 30, 2011

(54) METHOD AND A SYSTEM FOR PROVIDING A CERTAIN QUALITY OF SERVICE TO A MOBILE STATION IN A MOBILE COMMUNICATION SYSTEM

(75) Inventor: Anders Andersson, Kungälv (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 455 days.

(21) Appl. No.: 10/584,865

(22) PCT Filed: Dec. 30, 2003

(86) PCT No.: PCT/SE03/02103
§ 371 (c)(1),
(2), (4) Date: May 4, 2007

(87) PCT Pub. No.: WO2005/064980
PCT Pub. Date: Jul. 14, 2005

(65) Prior Publication Data
US 2007/0232276 A1    Oct. 4, 2007

(51) Int. Cl.
*H04L 12/28* (2006.01)
(52) U.S. Cl. ............ 370/395.21; 370/310; 370/350; 370/395.1; 455/432.1
(58) Field of Classification Search .................. None
See application file for complete search history.

(56) References Cited

U.S. PATENT DOCUMENTS

| | | | |
|---|---|---|---|
| 6,192,234 B1 * | 2/2001 | Chavez, Jr. | 455/414.1 |
| 6,192,248 B1 | 2/2001 | Solondz | |
| 6,469,993 B1 * | 10/2002 | Seo et al. | 370/329 |
| 6,519,640 B2 * | 2/2003 | Hattori et al. | 709/224 |
| 6,529,907 B1 * | 3/2003 | Terakura et al. | 707/9 |
| 6,556,824 B1 | 4/2003 | Purnadi et al. | |
| 6,564,066 B1 * | 5/2003 | Biggs et al. | 455/512 |
| 6,907,258 B2 * | 6/2005 | Tsutsumi et al. | 455/512 |
| 7,257,404 B1 * | 8/2007 | Chow et al. | 455/436 |
| 2002/0010772 A1 * | 1/2002 | Kusano | 709/223 |
| 2002/0019853 A1 * | 2/2002 | Vange et al. | 709/207 |
| 2002/0025816 A1 | 2/2002 | Johansson et al. | |
| 2002/0126656 A1 * | 9/2002 | Park | 370/352 |
| 2003/0186724 A1 * | 10/2003 | Tsutsumi et al. | 455/561 |
| 2003/0195966 A1 * | 10/2003 | Fujii | 709/228 |
| 2004/0098507 A1 * | 5/2004 | Thubert et al. | 709/245 |
| 2005/0094675 A1 * | 5/2005 | Bhushan et al. | 370/527 |

FOREIGN PATENT DOCUMENTS

EP    1 045 604    10/2000

OTHER PUBLICATIONS

International Search Report for PCT/SE2003/002103 dated Aug. 10, 2004.

* cited by examiner

*Primary Examiner* — Huy D Vu
*Assistant Examiner* — Zewdu Beyen
(74) *Attorney, Agent, or Firm* — Nixon & Vanderhye P.C.

(57) ABSTRACT

A method and a system are disclosed for providing a certain quality of service to a user-device within a mobile telecommunication system. The telecommunication system comprises one or several user-registers linked to a user-device, and one or several priority-tables associated with an area covered by the telecommunication system. A user-register is compared with a priority-table when a user-device linked to said user register enters the area associated with said priority-table. The user-device can then be provided with a certain quality of service depending on a possible correspondence between the user-register and the priority-table.

13 Claims, 7 Drawing Sheets

METHOD AND A SYSTEM FOR PROVIDING A CERTAIN QUALITY OF SERVICE TO A MOBILE STATION IN A MOBILE COMMUNICATION SYSTEM

This application is the US national phase of international application PCT/SE2003/002103 filed 30 Dec. 2003, which designated the U.S., the entire content of which is hereby incorporated by reference.

FIELD OF INVENTION

The invention is related to a method and a system for providing a certain quality of service to a user-device within a mobile telecommunication system. In particular, the invention relates to a cellular mobile telecommunication system.

BACKGROUND

Figure 1:
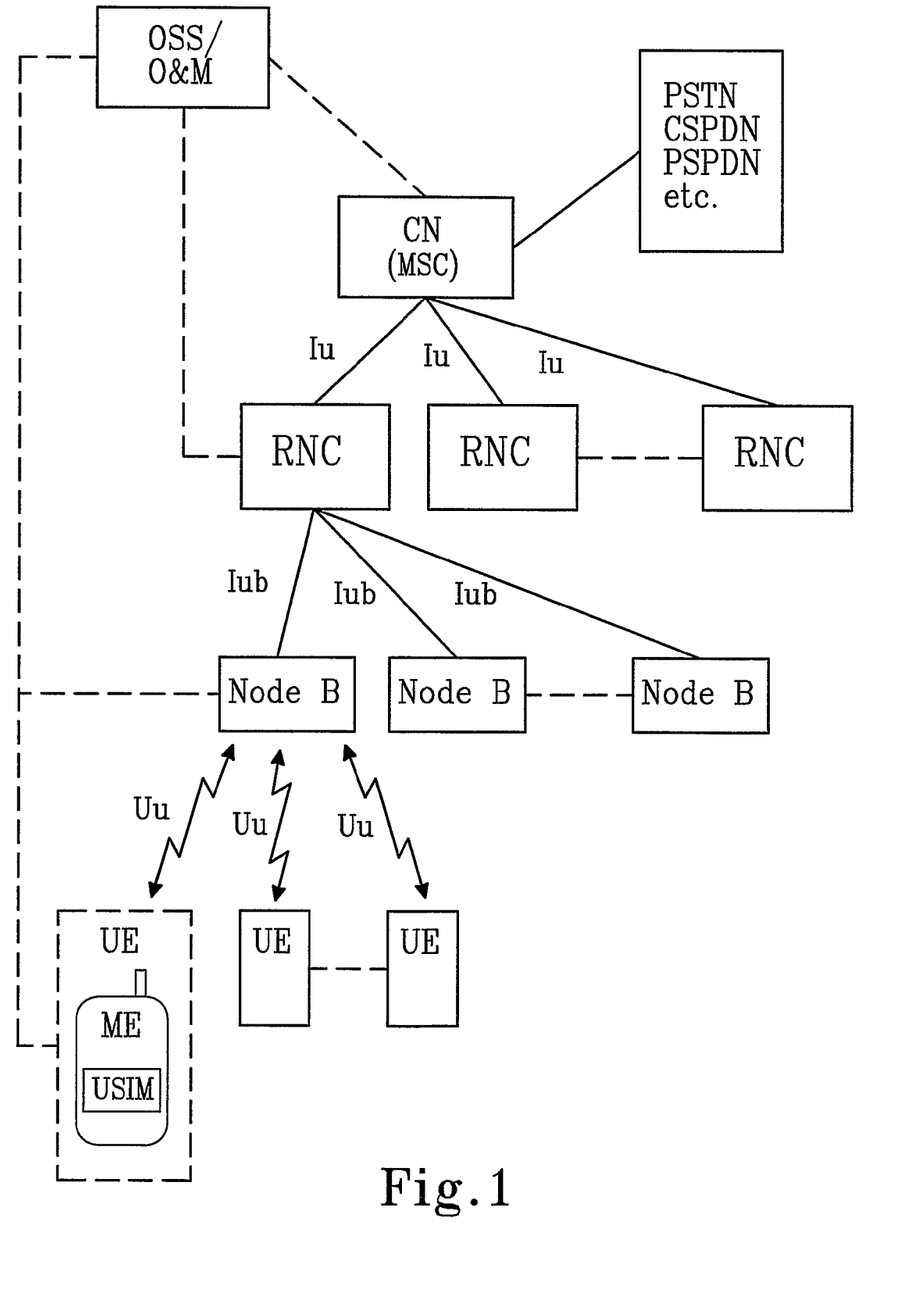

A mobile telecommunication system, as illustrated schematically in FIG. 1, generally comprises a plurality of user-devices. In a Universal Mobile Telecommunication System (UMTS) such user-devices are referred to as the User Equipment (UE). A UMTS User Equipment (UE) consists of the terminal, referred to as the Mobile Equipment (ME), and a smart card referred to as the User Subscriber Identity Module (USIM). The USIM provides a user with access to subscribed services irrespective of the specific Mobile Equipment (ME) used. Hence, by inserting a USIM-card into a Mobile Equipment (ME), the user is able to receive calls at that equipment, make calls from that equipment, and receive other subscribed services. Almost every telecommunication system comprises user-devices of some kind. For example, a user-device in the Global System for Mobile Communications (GSM) is referred to as the Mobile Station (MS), which essentially corresponds to the User Equipment (UE) in the UMTS-system.

A mobile telecommunication system also generally comprises a telecommunication network for connecting a user-device to a service provided through the network and/or by the network. A user-device in a mobile telecommunication system is typically connected to the telecommunication network via a radio access point. Access points in the UMTS-system are referred to as Node B. A Node B houses one or several radio transceivers and handles the radio-link protocols with the User Equipment (UE). Each Node B provides radio coverage in a specific area and therefore effectively defines the cell of the UMTS cellular system. In a large urban area, there will potentially be a large number of Node B(s) deployed. The corresponding access points in a GSM-system are referred to as Base Transceiver Stations (BTS). Other telecommunication systems may have other kind of radio access points or radio nodes for connecting a user-device to a telecommunication network.

One or several access points in a general telecommunication network may in turn be connected to a controller. In an UMTS-system such controllers are referred to as a Radio Network Controller (RNC). The RNC is responsible for the control of a group of Node B(s), where it monitors each call and i.a. decides when to handover the call from one Node B to another. The RNC also commands exchange functions and control of the radio frequency power levels of the associated group of Node B(s). Corresponding controllers in a GSM system is referred to as Base Station Controller (BSC). Other telecommunication systems may have other types of controllers or nodes for managing a group of access points.

One or several access point controllers in a general telecommunication network may in turn be connected to a switching centre or similar. A switching centre may be referred to as a Mobile-services Switching Centre (MSC), which is the common expression in both UMTS and GSM. The MSC is a complete exchange, capable of routing calls from a fixed network via the BSC/RNC and BTS/Node B to an individual MS/UE. The fixed network may e.g. be a Public Switched Telephone Network (PSTN), a Circuit Switched Public Data Network (CSPDN) or a Packet Switched Public Data Network (PSPDN) or similar. The MSC also serves to co-ordinate setting up calls to and from UMTS/GSM users, i.e. between individual UE(s)/MS(s). The MSC has e.g. a correspondence in the Serving GPRS Support Node (SGSN) in a General Packet Radio Service system (GPRS).

In UMTS, a RNC and its underlying Node B(s) are referred to as a Radio Network Subsystem (RNS), whereas in GSM a BSC and its underlying BTS(s) is referred to as a Base Station Subsystem (BSS). In order to obtain radio coverage of a given geographical area, a number of RNS(s)/BSS(s) are normally required; i.e. each MSC would thus have to interface to one or more RNS(s)/BSS(s). In addition more than one MSC(s) may be required to cover a country. The MSC and associated components may in turn be denoted the Network Subsystem (NSS) or the Core Network (CN).

The communication between the different parts in an UMTS-system and/or a GSM-system, are conducted via standardised interfaces allowing operation between components made by different suppliers. An UMTS User Equipment (UE) communicates with a Node B via an Uu-interface, whereas a Node B communicates with a Radio Network Controller (RNC) via an Iub-interface. In turn, the RNC communicates with a Mobile-service Switching Centre (MSC) via an Iu-interface. A GSM Mobile Station (MS) communicates with a Base Transceiver Station (BTS) via an Um-interface, whereas a BTS communicates with a Base Station Controller (BSC) via an Abis-interface. In turn, the BSC communicates with a Mobile-service Switching Centre (MSC) via an A-interface.

Such mobile or wireless telecommunication systems as the GSM and the UMTS described above are generally organised in a hierarchic structure. However, a mobile or wireless telecommunication system can have vast variety of different structures, e.g. depending on the underlying technique, the performance needed, the acceptable economic costs etc. Other mobile or wireless telecommunication systems may e.g. be structured as a ring network or a bus network or as a star network etc.

The mobile telecommunication systems as indicated above may have different quality of service supplied to different users of the system. One such differentiation of the quality of service can be accomplished by dividing the users of a particular telecommunication system into groups, where the users in a specific group may be provided with a certain quality of service, which may differ from one group to another. The specific quality of service that is supplied to a certain group of users may be determined by assigning a priority level to each group. A higher priority may result in a higher quality of service and a lower priority may result in a lower quality of service.

Many mobile telecommunication systems support such a group priority. However, the priority level for a user is normally fixed and kept the same in all areas covered by the system. Some mobile telecommunication systems also support a type of access differentiation that provides some users with exclusive access to certain parts of the system. For example, a certain base station in a GSM-system may only be accessed by a small group of users, whereas other users of the same system are prohibited from accessing this particular base station. However, a possible priority level for a user with access to a particular base station is normally fixed and the quality of service corresponds either to access or to no access.

Accordingly, in known mobile telecommunication systems a user may be assigned a certain priority level and a certain quality of service within a certain coverage area of a mobile telecommunication system. However, the priority levels and the quality of service are coarsely segmented and essentially static. Accordingly, there is a need for an improved distribution of the quality of service within a telecommunication system.

SUMMARY

An object is to provide a system and a method that overcomes the problems mentioned above, where the system and the method makes it possible to provide the users of a mobile telecommunication system with a different quality of service in different coverage areas of the system. A further object is to provide a system and a method that makes it possible to dynamically change the quality of service for a user, which enables an adaptation to occurrences in the area covered by the mobile telecommunication system.

Users of a mobile telecommunication system are grouped into one or more priority-groups. The possible priority-group or groups to which a specific user belongs are defined in a user-register. In turn, the user-register is linked to the user and to a user-device. Such a user-register may have additional information about the user and the user-device in question.

One or more priority-tables are provided, each associated with one or several areas covered by the mobile telecommunication system. A priority-table comprises one or several priority-levels, where each priority-level can be assigned one or several priority-groups. It is preferred that a priority-table can be changed to meet the present need to prioritise particular users within a particular area covered by a telecommunication system.

Moreover, a priority-table is compared with a user-register when a user-device linked to said user-register enters an area associated with said priority-table. The user-device can then be provided with a certain level of service within said area, depending on a possible correspondence between the priority-table and the user-register, preferably a correspondence between the priority-groups defined in the user-register and the priority-groups assigned to the priority-levels in the priority-table.

Such an user-register and such a priority-table can be arranged in a number of mobile telecommunication systems. These telecommunication systems generally comprise a plurality of user-devices and a telecommunication network, where a user-device is connected to the network via an access point that interacts with the user-device to form an air interface between the user-device and the network. Said access points may in turn be connected to a controller, where one or several controllers in turn may be connected to a switching centre. However, one or more access points may be directly connected to a switching centre. Likewise, one or more controllers may be operational without any further connection to a centralised switching centre.

The user-registers are primarily defined and located in the central network of a mobile telecommunication system. However, a user-register may be wholly or partly copied and/or distributed to other parts of the telecommunication system.

The priority-tables are also primarily defined and located in the central network of a mobile telecommunication system, or in a part that is closely related to the function of the central network. However, some or all priority-tables may be copied and/or distributed to other parts of the telecommunication system.

The mobile telecommunication systems as indicated above are essentially organised in a hierarchic structure. However, the invention is not limited to systems with a hierarchic structure. A mobile telecommunication system may have vast variety of different structures. Other conceivable mobile telecommunication systems may be organised in a ring structure, a bus structure or a star structure etc.

One advantage is the ability to provide a group of users in a mobile telecommunication system with a quality of service that may differ between different coverage areas of the system, as well as differ within a certain coverage area of the system. Another advantage is the ability to easily accomplish a more or less dynamic change of the quality of service for a certain group of users within a coverage area by simply changing the priority-table associated with the coverage area in question. The primarily centralised user-registers also facilitate the addition of new of priority-groups or the deletion of old priority-groups for each user. Further advantages will appear from the following detailed description.

DETAILED DESCRIPTION

As there is a need for an improved system and method for providing the users of a mobile telecommunication system with different quality of service in different coverage areas of the telecommunication system, embodiments of such a system and such a method will be described in more detail below. In particular, at least one example embodiment may dynamically change the quality of service for one or several groups of users to adapt the behaviour of the system to occurrences in the specific coverage area of the cellular telecommunication system.

The example embodiments technology described herein are described in the light of an UMTS-system, though the technology described herein can be implemented in almost any mobile telecommunication system, e.g. in a GSM-system. In particular, the technology described herein-is not limited to systems with a hierarchic structure. On the contrary, the technology can be implemented in a vast variety of different mobile or wireless telecommunication systems having different structures, e.g. depending on the underlying technique, the performance needed, the acceptable economic costs etc. Other mobile or wireless telecommunication systems wherein the invention can be implemented may e.g. be structured as a ring network, or a bus network or as a star network etc. In addition to the UMTS- and GSM-system already mentioned the Wireless Local Area Networks (WLAN) is another example of a mobile telecommunication system wherein the technology described herein can be implemented.

User-Registers

Figure 2:
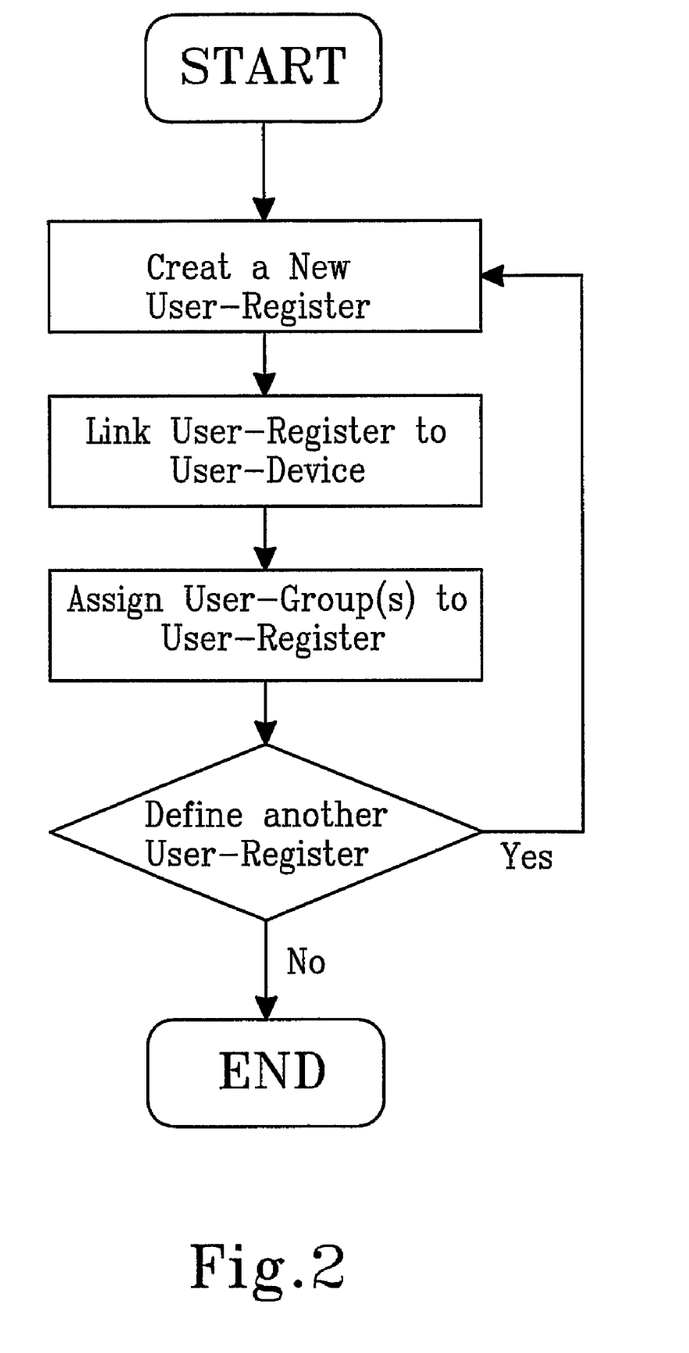
FIG. 2 is a flowchart schematically illustrating the creation of a user-register according to an example embodiment.

According to a preferred example embodiment of the present invention each user of an UMTS-system can be provided with a user-register, the creation of which is schematically illustrated by the flowchart in FIG. 2.

A user-register can be assigned one or more priority-groups. Each user-register is preferably linked to a user subscription within the UMTS-system, which user subscription in turn is linked to the USIM of a certain UE.

The user subscriptions are preferably reflected in the Home Location Register (HLR) of the UMTS-system, and the user-register is therefore preferably a part of the information in the user subscription stored in the HLR, though other organisations and/or locations of the user-registers are conceivable. A user-register may even be stored in one or more RNC(s) or even in a UE.

The HLR is essentially a database or a part of a database that stores the administrative information of each user registered in the UMTS-system. The database is primarily situated in the Core Network (CN) of the UMTS-system, where it can be used by the MSC and other parts of the CN. This has been illustrated in FIG. 7 by a database connected to the CN, which database according to this embodiment comprises the HLR and at least one user-register.

The HLR or parts of the HLR, especially the priority-groups for a user, may be copied and/or distributed to other parts of the UMTS-system, e.g. copied to a Visitor Location Area (VLR). It may also be copied and/or distributed to a RNC, a Node B or even all the way down to an UE. This alternative or supplement has been schematically illustrated in FIG. 7 by a database connected to a RNC, and/or to a Node B, and/or to a UE. Such an alternative or supplementary database comprises at least one user-register and it should be understood that the database is preferably incorporated into said RNC, Node B and/or UE, though other solutions are clearly conceivable.

A priority-group as mentioned above is typically unique for a certain category of users within the UMTS-system. These users may be categorised in many different ways. One such category may be people employed by a certain employer. Another category may be people with a certain occupation, e.g. ambulance personnel, police personnel or fire fighters. Still another category may be users that reside more or less permanently within a certain area, e.g. in an office block, in factory or at a construction site, etc. There may also be certain categories of users that reside more or less temporary within a certain area, e.g. rescue personnel at the scene of an accident etc.

Figure 3:
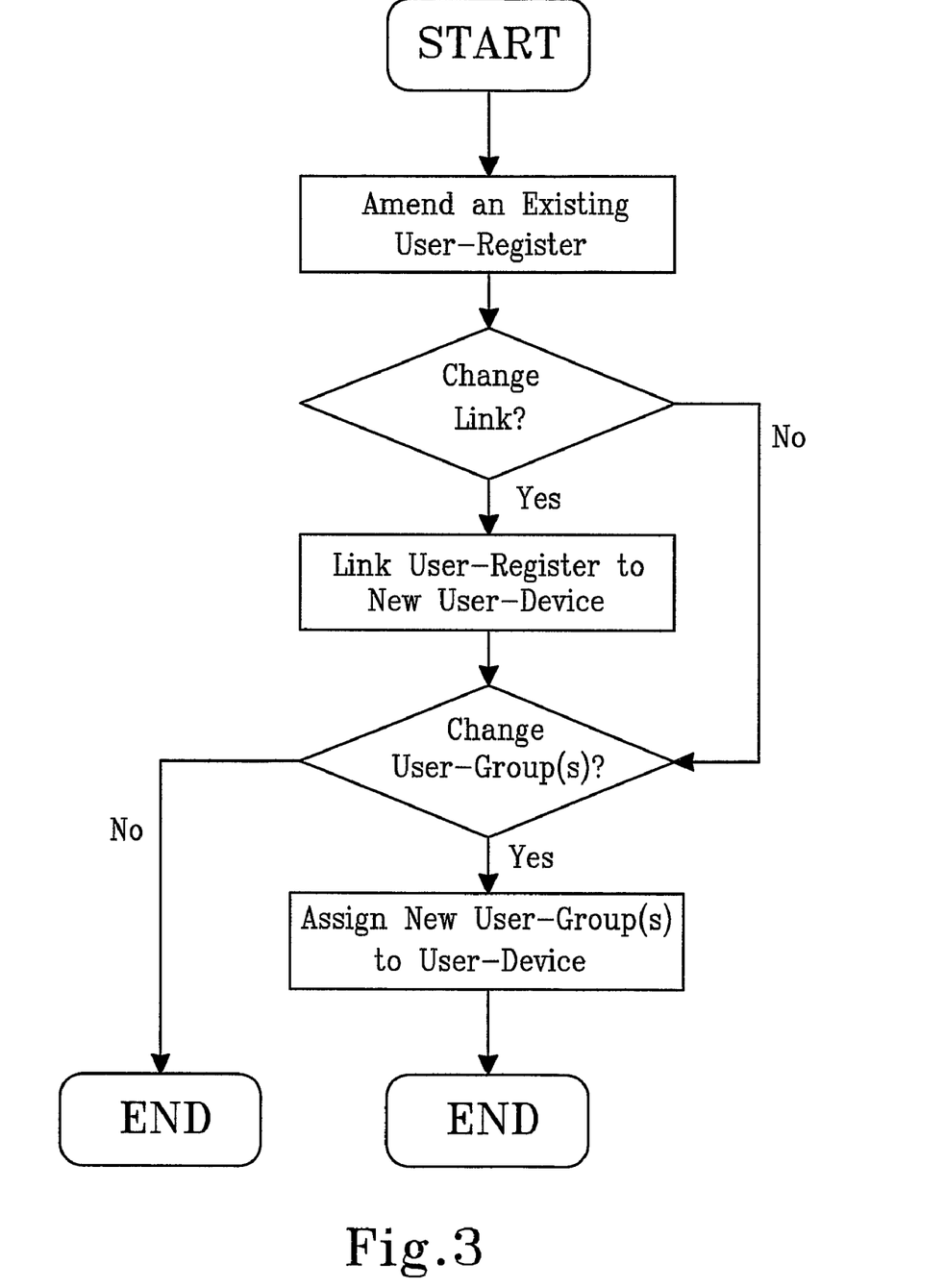
FIG. 3 is a flowchart schematically illustrating the modification of an existing user-register according to an example embodiment.

Furthermore, one or more parameters may also be changed in an existing user-register, as illustrated by the flowchart in FIG. 3. For example, a user-register may be linked to another user-device, e.g. by linking the subscription in the HLR to another USIM. Likewise, one or more user-groups may be more or less dynamically added or deleted from the user-register in question. This enables the UMTS-system to meet user demands for an altered priority in certain areas. It also enables the system to meet temporary needs to prioritise particular users within a particular coverage area of the UMTS-system.

Priority-Tables

Figure 4:
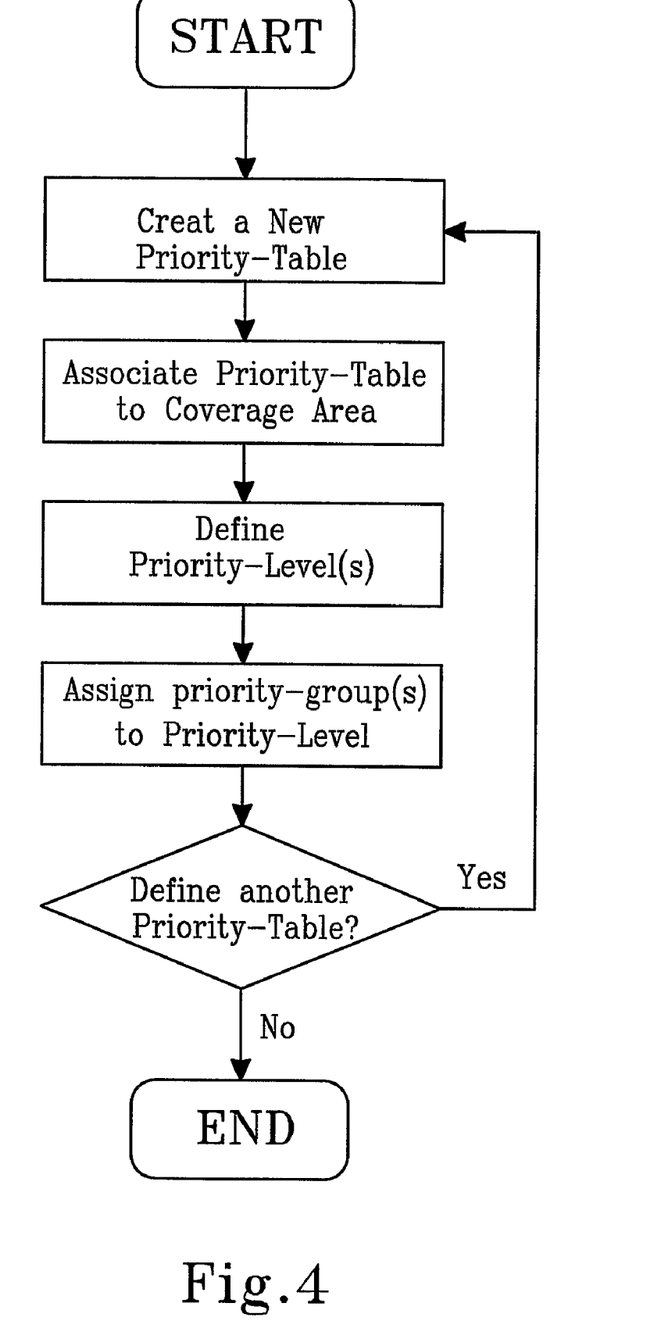
FIG. 4 is a flowchart schematically illustrating the creation of a priority-table according to an example embodiment.

In addition to priority-groups and user-registers as described above, a preferred embodiment of the present invention also provides for one or several priority-tables, the creation of which is schematically illustrated by the flowchart in FIG. 4.

The priority-tables are preferably defined by an Operations Support System (OSS) or by an Operation and Maintenance (O&M), or similar part of the UMTS-system. The priority-tables may furthermore be stored in an OSS or an O&M.

Figure 7:
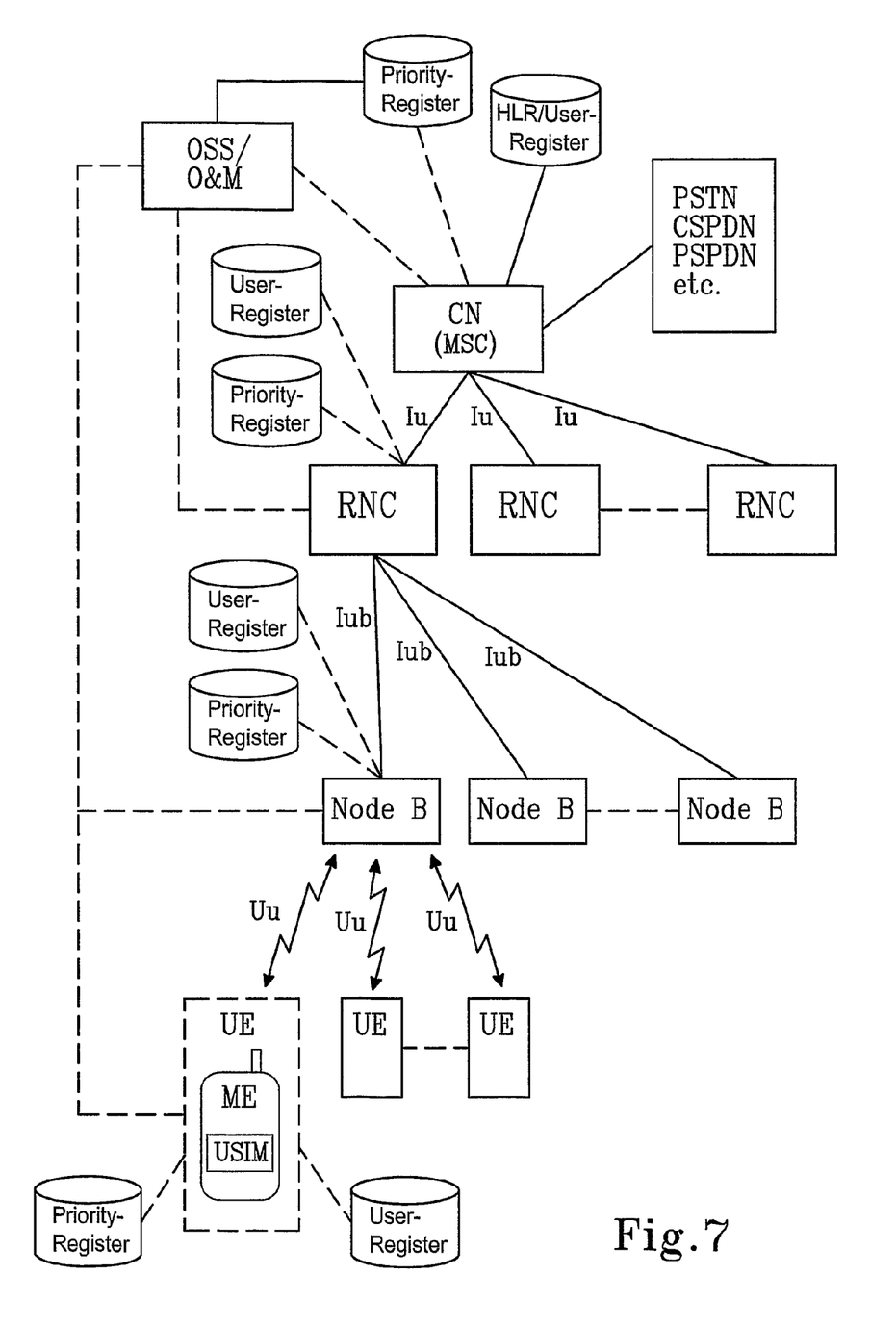
FIG. 7 is a schematic diagram of a Universal Mobile Telecommunication System (UMTS) according to an example embodiment.

This has been illustrated in FIG. 7 by a database connected to the OSS/O&M, which database comprises at least one priority-table. However, priority-tables may also be copied and/or distributed to other parts of the UMTS-system, e.g. copied and/or distributed to the CN (e.g. MSC), to a RNC, to a Node B or even all the way down to an UE. This alternative or supplement has been schematically illustrated in FIG. 7 by a database connected to a RNC, and/or to a Node B, and/or to a UE. Such an alternative or supplementary database comprises at least priority-table and it should be understood that the database is preferably incorporated into said RNC, Node B and/or UE, though other solutions are clearly conceivable.

Each priority-table is preferably associated with a sub-area within the coverage area of the UMTS-system. The sub-area to which a priority-table is attached may correspond to the area covered by an individual Node B. However, a sub-area may also correspond to the area covered by a cluster of Node B(s) controlled by a specific RNC. A sub-area may also correspond to any combination of areas covered by one or several individual Node B(s) and areas covered by one or several RNC(s) and their cluster of Node B(s) respectively. It should be noted that some of these areas could overlap, e.g. when a micro cell is located within the coverage area of a macro cell.

A priority-table may comprise an area-identifier that associate the priority-table with a sub-area covered by the UMTS-system, though other association mechanisms are clearly conceivable. The area-identifier may in turn be associated with a coverage area corresponding to a Location Area Identification (LAI), a Routing Area Identification (RAI), a Cell Identity (CI), a Cell Global Identification (CGI) and/or corresponding to a RNC Identifier (RNC-Id) or a Service Area Identifier (SAI). Some of these identifiers may even be used directly, where the identifier is stored in a priority-table more ore less as it is to associate the table with a certain coverage area.

It is further preferred that a priority-table comprises one or several priority-levels, where each priority-level can be assigned one or several priority-groups. The contents of a certain priority-table may be unique within the UMTS-system. However, some embodiments may have priority-tables with similar content (e.g. identical priority-groups associated with identical priority-levels), where each table is used in a separate sub-area, which sub-areas possible overlaps each other.

Figure 5:
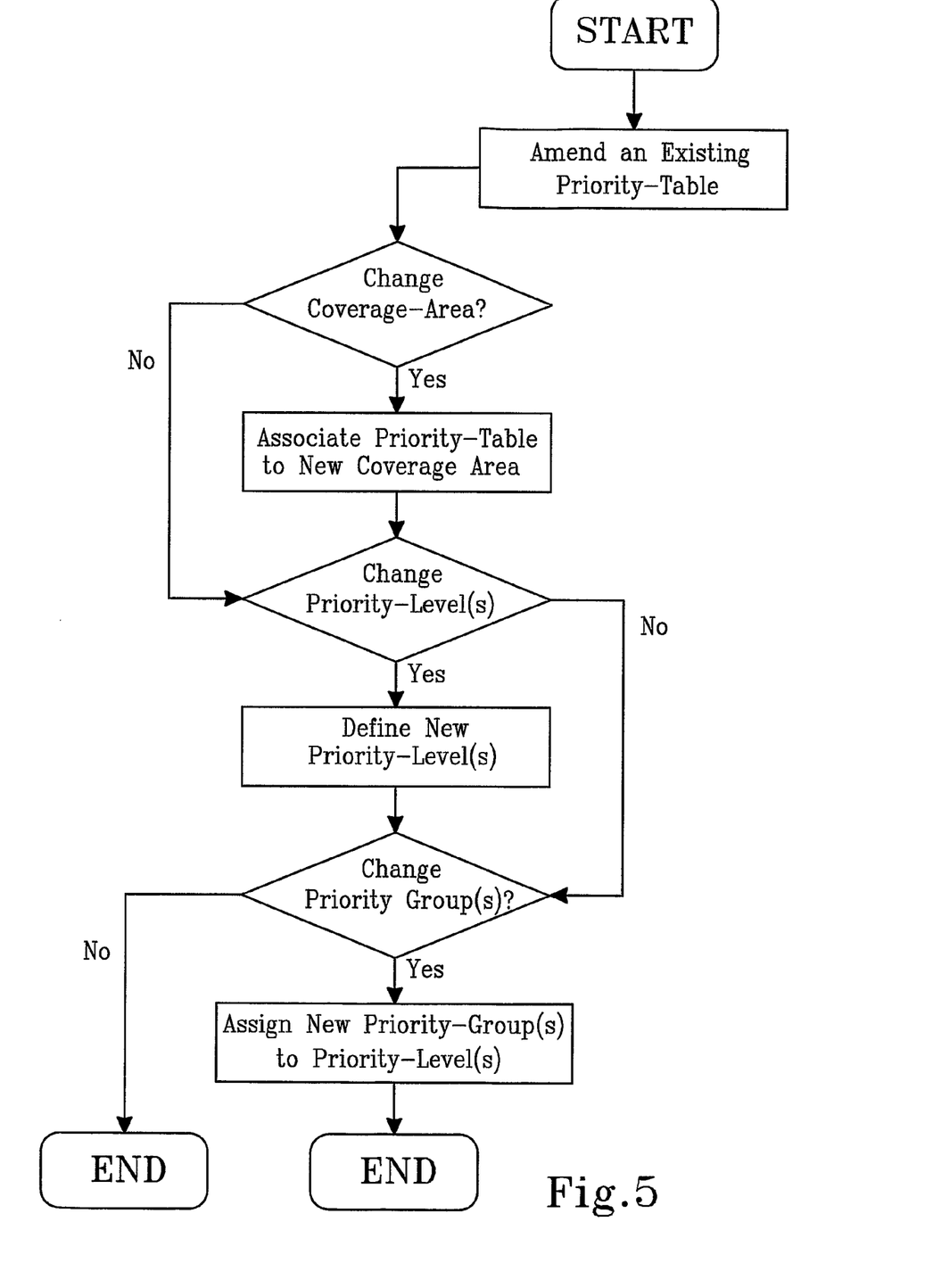
FIG. 5 is a flowchart schematically illustrating the modification of an existing priority-table according to an example embodiment.

In addition, one or more parameters may also be changed in an existing priority-table, as illustrated by the flowchart in FIG. 5. For example, an existing priority-table may be associated with another coverage area, e.g. by changing the area-identifier within the table. Likewise, one or more priority-levels may be more or less dynamically added or deleted from a priority-table. Furthermore, one or several priority-groups may be more or less dynamically added or deleted from each priority-level in an existing priority-table. This enables the system to meet user demands for altered priority in certain areas. It also enables the system to meet temporary needs to prioritise particular users within said coverage area. This may be particularly advantageous e.g. when an accident occurs. The provider or the manager of a mobile telecommunication system can then prioritise some users (e.g. ambulance, police or fire-fighters) on behalf of others, by increasing the priority for some users or even block the access to the telecommunications system for some users. This may be achieved by temporarily changing the priority-table for a certain sub-area or certain sub-areas via an Operations Support System (OSS) or via an Operation and Maintenance (O&M) function, or similar part of the UMTS-system.

Even though the expression "priority-table" has been used above it should be understood that the information in a "priority-table" could have any representation or organisation, e.g. a list, a catalogue, a register, a directory or a record of a suitable type.

Prioritising in the Core Network (CN)

An aggregation of all or some of the above-described priority-tables may be copied and/or distributed to the Core Network (CN), so as to make the tables available to the CN (e.g. the MSC). This alternative has been illustrated in FIG. 7 by a database connected to the CN, which database comprises at least one priority-table. The database may be the same as the one used by the OSS/O&M. In an alternative a copy of the OSS/O&M-database can be provided to the CN. In another alternative the database may simply be situated in the CN, whereas the OSS/O&M only updates the database. Other solutions are of course conceivable.

The priority-tables that have been distributed and/or copied to the CN can subsequently be used for providing an UE with a certain quality of service. It is then preferred that the processing arrangements offered by the MSC is used in this connection, though other parts of the CN may be used as an alternative and/or as a supplement.

To provide an UE with a specific quality of service according to this embodiment of the invention the appropriate priority-table must be identified. To achieve this, the position of an UE connected to or seeking connection with the UMTS-network is preferably supplied to the CN (e.g. the MSC). This position can e.g. be retrieved by using a positioning function provided by the UMTS-system or by supplying the CN (e.g. the MSC) with the identity of the Node B and/or the RNC that is currently responsible for said connection with the UE, so as to implicitly indicate the particular coverage area wherein the UE is presently located.

The CN (e.g. the MSC) can then use the position of the UE and match it with the area-identifier that is stored in the priority-tables as mentioned above. When the position of the UE matches an area-identifier in a priority-table the appropriate priority-table has been identified, i.e. the priority-table associated with the particular coverage area wherein the UE is presently located.

In addition, it is preferred to identify the user-register linked to the UE in question. In this connection it is well known that the identity of the USIM in an UE connected to or seeking connection with the UMTS-system is supplied to the CN (e.g. the MSC) in an UMTS-system. The CN (e.g. the MSC) may consequently use this USIM-identity to find the appropriate subscription in the HLR linked to the USIM, which subscription also comprises the user-register for the particular UE as previously described.

The relevant priority-table and the relevant user-register are now available to the CN (e.g. the MSC) and the CN can compare said user-register with said priority-table. The UMTS-network, e.g. the MSC in the CN, can then provided UE in question with a certain level of service, depending on a possible match of the priority-groups defined in the user-register and the priority-groups assigned to the priority-levels in the priority-table.

Figure 6:
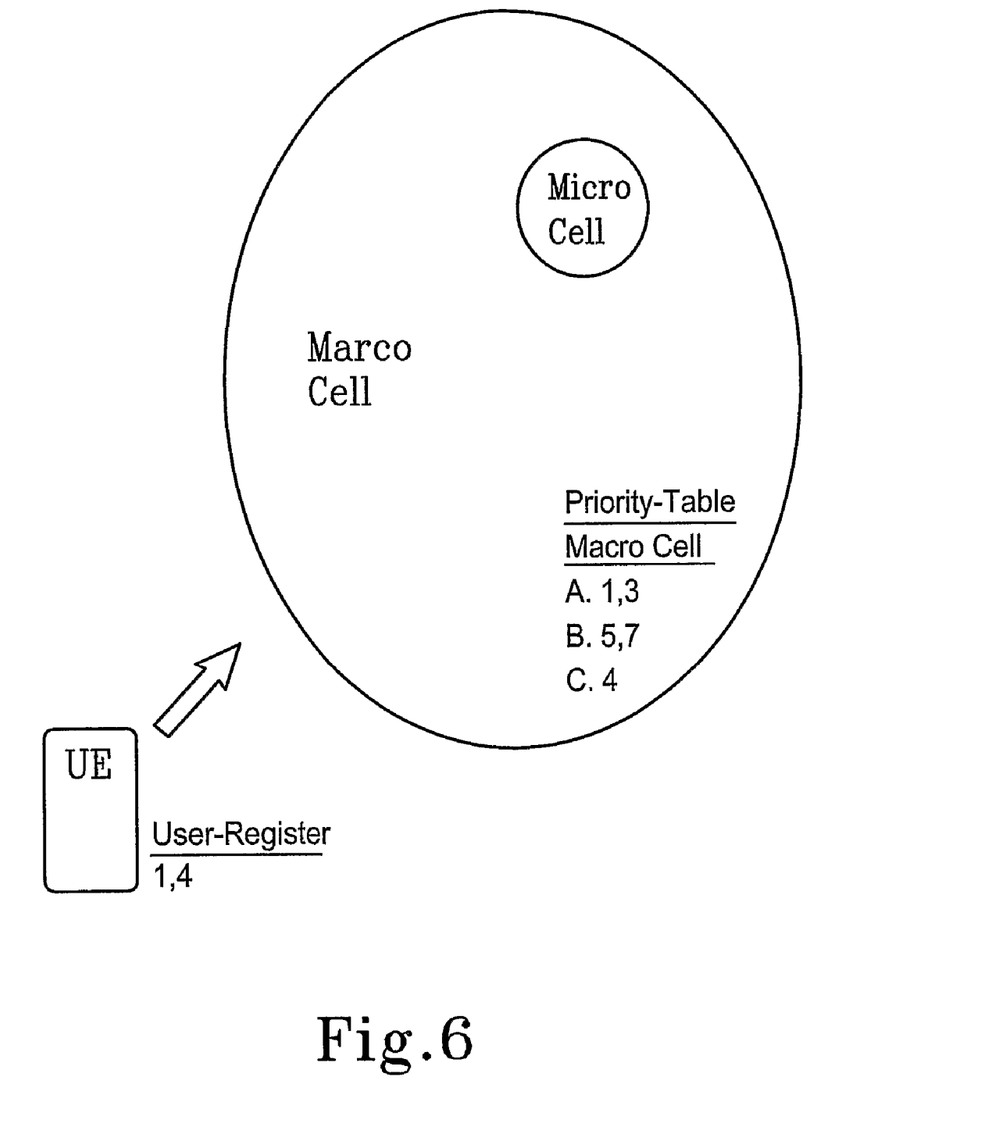
FIG. 6 is a schematic diagram illustrating a macro cell and a micro cell, and a user equipment of an UMTS-system, where according to an example embodiment a user-register has been linked to the user equipment and a priority table has been associated to the macro cell.

An exemplifying scenario according to FIG. 6 may be used to illustrate what has now been said. A user-register linked to the UE has been assigned the priority-groups 1 and 4. A priority-table associated with a macro cell has in turn the priority-groups 1, 3 assigned to priority-level A, group 5 and 7 assigned to level B, and group 4 assigned to level C. Other possible groups within the UMTS-system, e.g. 2, 6, 8 . . . n, are not associated with any priority-level in this exemplifying priority-table. According to this scenario there will be a match for priority-levels A and C when the UE linked to said user-register enters the area associated with the priority-table, as indicated by the arrow in FIG. 6. The expression "enters the area" comprises an UE that is already situated within an area and powers up within that area.

As there is two matching priority-groups in this example it is preferred that the UE is assigned the highest priority-level, which is supposed to be priority-level A. The quality of service associated with priority-level A is consequently provided to the UE. Moreover, it can be noted that an UE may occasionally reside in an area that is covered by two different priority-tables. This may e.g. occur when a micro cell is situated within the coverage area of a macro cell. In that case the UE is preferably provided with the quality of service associated with the micro cell, though other solutions are conceivable.

Prioritising in the Radio Network Subsystem (RNS)

As mentioned above, a priority-table may be associated with an area covered by a RNC. Such a priority-table can be distributed to the RNC in question. This alternative has been illustrated in FIG. 7 by a database connected to the RNC, which database comprises at least one priority-table.

The location of the priority-table itself can then be used to implicitly define the coverage area associated with the priority-table, as will be described below. Consequently, a priority-table that is associated to the coverage area of an RNC must not necessarily comprise an area-identifier, provided that the table is distributed to the RNC in question.

To be able to use a priority-table distributed to a RNC for granting a certain quality of service to an UE it is preferred to obtain the user-register linked to the UE in question. As already mentioned the identity of the USIM in an UE connected to or seeking connection with the UMTS-system is supplied to the CN (e.g. the MSC) in a well-known manner. The CN (e.g. the MSC) may then use this USIM-identity to find the appropriate user-register linked to that particular UE and subsequently distribute the user-register to the RNC in question.

The RNC can then compare the received user-register with the priority-table previously stored in the RNC and then supervise the quality of service provided to the UE, depending on a possible match of the priority-groups in the user-register and the priority-groups associated with the priority-levels in the priority-table.

According to the embodiment now indicated it is preferred that the processing arrangements offered by the MSC is used for comparing user-registers with the priority-table and for supervising the quality of service provided to the UE. However, the RNC may alternatively transmit the outcome of the comparison to the CN (e.g. the MSC), whereby the CN may control the quality of service provided to the UE depending on said outcome. In that case it may not be necessary to provide the RNC with the processing arrangements needed for controlling the quality of service provided to the UE.

In addition to associating a priority-table with an area covered by a RNC, it should be observed that a priority-table could be associated with an area covered by an individual Node B. A priority-table of that kind can be distributed to the Node B in question, where the location of the priority-table itself can be used to implicitly define the coverage area associated with the priority-table. The user-register, the priority-table and the control of the quality of service provided to an UE can then be handled by the Node B mutatis mutandis as described above in connection with a priority-table distributed to a RNC. For example, it is preferred that the processing arrangements offered by the Node B is used for comparing user-registers with the priority-table and for supervising the quality of service provided to the UE, though other solutions are clearly conceivable.

Prioritising in the User Equipment (UE)

The attention will now be shifted to the possible distribution of user-registers within an UMTS-system.

It was mentioned above that the USIM of an UE is linked to a user subscription, and that the user subscription and the associated user-register are preferably reflected in the HLR of an UMTS-system. However, some or all of the user-registers may be distributed to other parts of the UMTS-system. A certain user-register may in particular be distributed to an UE that has been provided with an USIM linked to the subscription associated with the user-register in question.

A user-register can be distributed and/or stored in an UE in several ways. For example, it may be provided to an UE (i.e. ME+USIM) from the UMTS-network, e.g. from a Node B, a RNC or even from the CN (e.g. the MSC). A user-register may also be initiated separately in the USIM, without any connection with the UMTS-network. Regardless if a user-register is downloaded from the CN or predefined in the USIM it may be dynamically updated by the UMTS-network (e.g. CN) where appropriate, e.g. if the subscription is altered.

If a user-register is stored in an UE it may also be distributed from the UE to the UMTS-network, preferably to the Node B, or the RNC, or the CN that holds the priority-table associated with the coverage area wherein the UE is presently located. The distributed user-register and the relevant priority-table can then be compared by the UMTS-network and the quality of service provided to the UE can be controlled, essentially as previously described above.

A priority-table may in a similar fashion be distributed to an UE that enters the coverage area associated with the priority-table in question. This is especially advantageous if the relevant priority-table has been previously distributed to the RNC or the Node B covering the area wherein the UE is currently located. The RNC or the Node B can then, without assistance from the CN, distribute the priority-table further to the UE when it enters the coverage area of the RNC or the Node B. The priority-table is preferably distributed through a control channel that the UMTS-system establishes between the UE and the UMTS-network. At least one such a control channel is principally always upheld, whereas a traffic channel is only established upon a call connection to the UMTS-network, which involves a fairly extensive communication between the UE and the CN.

This enables the UE to compare the received priority-table with the user-register previously stored in the UE, and the UE may then decide for itself, i.e. without involving the UMTS-network, if it should inquire a certain level of service from the UMTS-network or not, depending upon a possible match of the priority-groups defined in the user-register and the priority-groups associated with the priority-levels in the priority-table. On the other hand, the UE must not necessarily inquire the UMTS-network for a certain level of service. On the contrary, the UE may itself determine one-sided limitations on the quality of service. The UE may even determine from the comparison that it is not allowed to attempt to establish a traffic channel with the UMTS-network in the present coverage area, or for that matter any other channels in addition to a possible control channel. In the scenario now indicated it is preferred that the processing arrangements provided by the UE is used to compare the user-register with priority-tables and for controlling the quality of service provided to it. In many embodiments the demands on the UMTS-network can be radically reduced if the quality of service is generally determined by the UE itself. This is especially the case when the UE can determine whether It is allowed to establish a traffic channel with the UMTS-network or not, since this can be performed essentially without imposing any load on the CN.

Non-limiting example embodiments of the invention have now been described essentially in connection with an UMTS-system. However, embodiments are certainly applicable in a GSM-system. In general it should be emphasised that the technology described herein can be implemented in essentially all known mobile telecommunication systems, regardless if such systems are organised in a ring structure, in a bus structure or in a star structure or in some other suitable structure. In particular, compared to an UMTS-system or a GSM-system, there may e.g. be another number of levels between an access point and a central switching centre or similar.

The invention claimed is:

1. A method for providing a certain quality of service to a user-device in a mobile telecommunication system, which system comprises different coverage areas, and a plurality of user-devices each linked to a user-register, which method comprises the steps of:

assigning one or more priority-groups to the user-register of the user-device, each priority-group being unique for a group of multiple users, providing at least one priority-table associated with one or several coverage areas of the system that includes multiple priority-levels, each priority-level associated with a quality of service and assigned one or more priority-groups, and providing said priority-table with an area-identifier that associates the priority-table with a coverage area, including the user-register in the user-device distributing the priority-table to the user-device when the user-device enters a coverage area associated with the priority table, the user-device then comparing the distributed priority-table with the user register in the user-device, and if one of the priority-groups defined in the user-register and one of the priority-groups in the distributed priority-table match, then assigning to the user device the quality of service associated with a priority-level for the one priority-group in the priority-table so that the one priority group of multiple users can be provided with the assigned quality of service, and determining limitations on the quality of service in the user-device such that the user-device determines whether it is allowed to establish a traffic channel.

2. The method according to claim 1, comprising the further step of linking the user-register to a user subscription within the telecommunication system, which subscription in turn is linked to a user-device.

3. The method according to claim 1, wherein said area-identifier is associated with a covering area corresponding to one of: a Location Area Identification (LAI), a Routing Area Identification (RAI), a Cell Identity (CI), a Cell Global Identification (CGI) and/or corresponding to a RNC Identifier (RNC-Id) or a Service Area Identifier (SAI).

4. The method according to claim 1, comprising an additional step in that the user-device determines limitations on the quality of service.

5. The method according to claim 1, comprising the further step of altering the quality of service in a certain area by amending an existing user-register.

6. The method according to claim 1, comprising the further step of altering the quality of service in a certain area by amending an existing priority-table.

7. A mobile telecommunication system, comprising:
different coverage areas,
a plurality of user-devices each including a corresponding user-register,
the user-register of a user-device being assigned one or more priority-groups, each priority-group being unique for a group of multiple users,
multiple priority-tables, each associated with one or several coverage areas of the system and provided with multiple priority-levels, each priority level being associated with a quality of service and assigned to one or more priority-groups, each priority-table having an area-identifier that associates the priority-table with a coverage area,
the user device being configured to identify one of the priority-tables by matching a present coverage area for the user-device with one of the coverage areas associated with the priority-tables using the area-identifier,
the user device being configured to match one of the priority-groups defined in the user-register with one of the priority-groups in the identified priority-table, and
means for assigning, based on the match, the quality of service associated with the priority-level for the one priority-group in the identified priority table to the user-device so that the one priority-group of multiple users can be provided with a particular quality of service,
wherein said user device is further arranged to determine whether it is allowed to establish a traffic channel.

8. The system according to claim 7, wherein the user-register is linked to a user subscription within the telecommunication system, which subscription in turn is linked to a user-device.

9. The system according to claim 7, wherein said area-identifier is associated with a covering area corresponding to one of: a Location Area Identification (LAI), a Routing Area Identification (RAI), a Cell Identity (CI), a Cell Global Identification (CGI) and/or corresponding to a RNC Identifier (RNC-Id) or a Service Area Identifier (SAI).

10. The system according to claim 7, wherein the user-device is arranged to determine limitations on the quality of service.

11. A mobile telecommunication system, wherein a certain quality of service is provided by at least one of a core network (CN) or a radio network controller (RNC) to a user-device within the system, which system comprises different coverage areas, and a plurality of user-devices each including a corresponding user-register, which system comprises:
the user-register of a user-device assigned with one or more priority-groups, each priority-group being unique for a group of multiple users,
multiple priority-tables, each associated with one or several coverage areas of the system and provided with multiple priority-levels, each priority level being associated with a quality of service and assigned to one or more priority-groups, each priority-table having an area-identifier that associates the priority-table with a coverage area,
wherein the user-device is configured to:
identify a present coverage area for said user-device,
identify one of the priority-tables by matching the present coverage area for the user-device with one of the coverage areas associated with the priority-tables using the area-identifier, and
match a priority-group defined in the user-register and a priority-group in the identified priority-table and have a quality of service associated with a priority-level for the matched priority-group in the identified priority-table assigned to the user-device so that the matched priority group of multiple users can be provided with a particular quality of service,
wherein said user device is further arranged to determine whether it is allowed to establish a traffic channel.

12. The system according to claim 11, wherein the user-register is linked to a user subscription within the telecommunication system, which subscription in turn is linked to a user-device.

13. The system according to claim 11, wherein said area-identifier is associated with a covering area corresponding to one of: a Location Area Identification (LAI), a Routing Area Identification (RAI), a Cell Identity (CI), a Cell Global Identification (CGI) and/or corresponding to a RNC Identifier (RNC-Id) or a Service Area Identifier (SAI).

\* \* \* \* \*

UNITED STATES PATENT AND TRADEMARK OFFICE
CERTIFICATE OF CORRECTION

PATENT NO.        : 8,009,675 B2                                                     Page 1 of 1
APPLICATION NO.   : 10/584865
DATED             : August 30, 2011
INVENTOR(S)       : Andersson It is certified that error appears in the above-identified patent and that said Letters Patent is hereby corrected as shown below:

In Fig. 2, Sheet 2 of 7, delete "Creat" and insert -- Create --, therefor.

In Fig. 4, Sheet 4 of 7, delete "Creat" and insert -- Create --, therefor.

In Column 4, Line 25, below heading "BRIEF DESCRIPTION OF THE DRAWINGS" insert -- FIG. 1 is a schematic diagram of a Universal Mobile Telecommunication System (UMTS). --.

In Column 4, Line 62, delete "herein-is" insert -- herein is --, therefor.

In Column 10, Line 13, delete "It" insert -- it --, therefor.

Signed and Sealed this
Twenty-eighth Day of February, 2012

David J. Kappos
*Director of the United States Patent and Trademark Office*